United States Patent [19]

Sakamoto et al.

[11] Patent Number: 4,821,112

[45] Date of Patent: Apr. 11, 1989

[54] DETECTION CIRCUIT FOR DETECTING STANDARD TELEVISION SIGNALS AND NONSTANDARD TELEVISION SIGNALS

[75] Inventors: Toshiyuki Sakamoto, Fujisawa; Ikuya Arai, Yokohama; Toshiyuki Kurita, Yokohama; Toshinori Murata, Yokohama; Isao Nakagawa, Yokohama; Masahiko Achiha, Iruma; Kazuo Ishikura, Hachioji, all of Japan

[73] Assignee: Hitachi, Ltd., Tokyo, Japan

[21] Appl. No.: 63,477

[22] Filed: Jun. 18, 1987

[30] Foreign Application Priority Data

Jun. 20, 1986 [JP] Japan .................................. 61-143019

[51] Int. Cl.⁴ .............................................. H04N 9/44
[52] U.S. Cl. .................................... 358/17; 358/148
[58] Field of Search ............... 358/17, 19, 21 R, 25, 358/11

[56] References Cited

U.S. PATENT DOCUMENTS

| | | | |
|---|---|---|---|
| 4,255,759 | 3/1981 | Ohmori et al. | 358/19 |
| 4,335,403 | 6/1982 | Srivastava | 358/148 |
| 4,454,531 | 6/1984 | Elmis et al. | 358/17 |
| 4,488,170 | 12/1984 | Nillesen | 358/19 |
| 4,613,827 | 9/1986 | Takamori et al. | 358/19 |
| 4,635,099 | 1/1987 | Nicholson et al. | 358/17 |
| 4,739,390 | 4/1988 | Achiha et al. | 358/11 |

OTHER PUBLICATIONS

Achiha et al., A Motion-Adaptive High-Definition Converter for NTSC Color TV Signals, Journal SMPTE vol. 93, No. 5, pp. 470-476, May 1984.
Nikkei Electronics, Jul. 1985, pp. 195-218.

Primary Examiner—John W. Shepperd
Attorney, Agent, or Firm—Antonelli, Terry & Wands

[57] ABSTRACT

There is provided a detection circuit for TV receiver which includes a frame comb filter and a field comb filter and which generates a luminance signal or a chrominance signal by effecting addition or subtraction upon video signals of two frames adjoining each other included in the received TV signal. This detection circuit includes a synchronization separation circuit, an APC circuit, a frequency division circuit connected to the APC circuit, and a comparator circuit connected to the frequency division circuit. The frequency of the chrominance subcarrier signal is demultiplied by the frequency division circuit. The phase of the chrominance subcarrier signal thus frequency-divided is compared with the phase of the synchronizing signal separated by the synchronizing separation circuit. It is thus judged whether the received TV signal is a standard TV signal or a nonstandard TV signal.

4 Claims, 10 Drawing Sheets

DETECTION CIRCUIT FOR DETECTING STANDARD TELEVISION SIGNALS AND NONSTANDARD TELEVISION SIGNALS

BACKGROUND OF THE INVENTION

In recent years, television receivers having semiconductor memories and using the digital signal processing technique for reproducing high-quality pictures have been developed. This TV receiver has a delay element for delaying TV signals by one frame period, for example, and a comb filter. Using the correlation between TV signals of two adjacent frames, the TV receiver separates a luminance signal and a chrominance signal from the TV signal. Further, the TV receiver has an interpolation circuit for producing a video signal to be inserted between adjacent scan lines using the correlation between two video signals of adjacent fields. In this TV receiver, the number of scan lines is increased to twice in one field period. This TV receiver is described in "Nikkei Electronics", July 1, 1985, P. 195 to 218, and "A Motion-Adaptive High-Definition Converter for NTSC Color TV Signals", SMPTE Journal, May 1984 writter by M. Achiha, et al., for example. Although the comb filter and the interpolation circuit of this TV receiver properly generate a video signal and a chrominance signal for a stationary picture signal as well known, the comb filter and the interpolation circuit generate a disturbance signal for a moving picture signal. Therefore, a movement detection circuit is used for detecting the difference signal of two video signals between frames to detect the movement of the picture. And the stationary picture signal undergoes temporal and spatial processing in a frame comb filter and an inter-field line interpolation circuit. The moving picture signal undergoes spatial processing of the signal between scan lines within one field.

The above described comb filter and interpolation circuit properly function with respect to a TV signal (hereafter referred to as a standard signal) whose chrominance subcarrier signal frequency $f_{SC}$, horizontal, scan signal frequency $f_H$ and vertical scan signal frequency $f_V$ accurately agree with predetermined frequency relationship. However, the comb filter and the interpolation circuit do not function properly with respect to a TV signal (hereafter referred to as a nonstandard signal) such as the signal of the home VTR or the personal computer whose chrominance subcarrier signal frequency $f_{SC}$, horizontal scan signal frequency $f_H$ and vertical scan signal frequency $f_V$ do not agree with the predetermined frequency relationship.

For example, the chrominance subcarrier signal frequency $f_{SC}$ and the horizontal scan signal frequency $f_H$ are so defined as to satisfy the relation:

$$f_{SC} = \frac{455}{2} f_H \quad (1)$$

And the horizontal scan signal frequency $f_H$ and the vertical scan signal frequency $f_V$ are so defined as to satisfy the relation:

$$f_H = \frac{525}{2} f_V \quad (2)$$

The frequency interleave relationship holds true between the luminance signal Y and the chrominance signal C. The phase of the chrominance subcarrier signal is inverted between signals one frame period apart. Using this phase difference in the frame comb circuit, the luminance signal is derived from the sum of two TV signals between frames and the chrominance signal is derived from the difference of two signals.

In the nonstandard signal whose frequencies $f_{SC}$, $f_H$ and $f_V$ do not satisfy the equations (1) and (2), however, the frequency interleave relation does not hold true. Even in a stationary picture signal, therefore, the luminance signal and the chrominance signal are not accurately separated from the TV signal. When it is judged that the picture is a stationary picture, the picture quality is significantly degraded. In the conventional TV receiver, it is thus difficult to apply suitable processing to a nonstandard signal.

SUMMARY OF THE INVENTION

An object of the present invention is to provide a detection circuit for detecting a nonstandard signal. The detection circuit according to the present invention includes a pulse generation circuit for separating a synchronizing signal from a TV signal and for generating a pulse signal having a repetition period $n \times T_H$ from the synchronizing signal thus separated (where $T_H$ is the horizontal scan period of the input signal), an APC (Auto Phase Control) circuit for generating a clock signal having a frequency equivalent to m times the frequency $f_{sc}$ of the chrominance subcarrier signal in phase-synchronism with the color burst signal included in the above described TV signal, a frequency divider for dividing the above described clock signal by a ratio of $k \times m \times n$ (where k is a constant), a comparator provided with the output pulse signal of the frequency divider and the above described pulse signal having the period $n \times T_H$ as input signals, and an integrator for integrating the output signal of the comparator. By using the output signal of the integrator, the detection circuit generates the detection signal of the nonstandard signal.

The frequency divider demultiplies with a ratio of $k \times m \times n$ the clock signal having a frequency $m \times f_{SC}$ generated by the APC circuit. A reference signal (hereafter referred to as carrier reference signal) representing the chrominance subcarrier frequency of the input signal is thus generated. The comparator compares the repetition period of the carrier reference signal generated by the frequency divider with the repetition period of the reference signal (hereafter referred to as synchronizing reference signal) having a repetition period $n \times T_H$ derived on the basis of the synchronizing signal of the input signal. If the received TV signal is a standard signal, the equations (1) and (2) are satisfied. As a result, the repetition periods of two reference signals agree each other. If the received TV signal is a nonstandard signal, the repetition periods of two reference signals do not agree with each other. The integrator integrates the detected comparison result to facilitate judging whether the state of the received TV signal is standard or not. Therefore, the nonstandard signal is detected from the output signal of the integrator.

DESCRIPTION OF THE PREFERRED EMBODIMENTS

Figure 1:
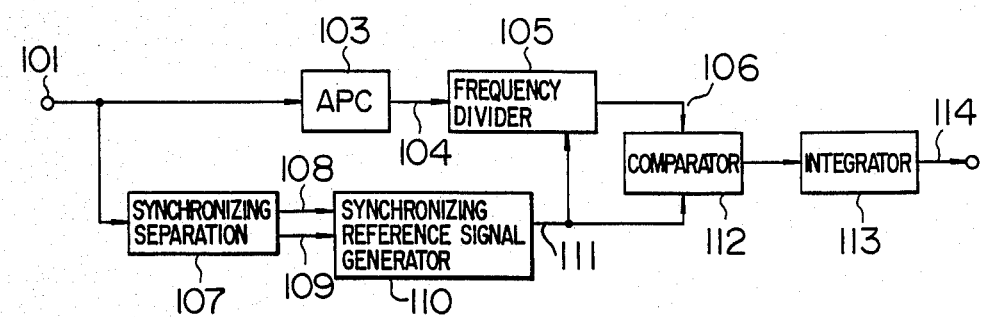
FIG. 1 is a block diagram of an embodiment of a detection circuit according to the present invention.

An embodiment of the present invention will now be described by referring to FIG. 1.

A TV signal inputted from an input terminal 101 is supplied to an APC circuit 103 and a synchronizing separation circuit 107. The APC circuit 103 has a phase-locked loop for extracting the color burst signal included in the TV signal and for generating a clock signal 104 phase-locked to the color burst signal. The frequency of the clock signal 104 (hereafter referred to as on APC clock signal) generated by this APC circuit 103 is so chosen as to be m times the chrominance subcarrier frequency $f_{SC}$ or the color burst signal frequency $f_{SC}$.

The synchronizing separation circuit 107 separates a horizontal synchronizing signal 108 and a vertical synchronizing signal 109 from the inputted TV signal and then supplies these signals to a synchronizing reference signal generator 110. On the basis of the horizontal synchronizing signal 108 and/or the vertical synchronizing signal 109, the synchronizing reference signal generator 110 generates a synchronizing reference signal 111 which is used as the reference of the synchronizing signal frequency of the inputted TV signal. The repetition period of the synchronizing reference signal 111 is so chosen as to be m times that of the horizontal or vertical synchronizing signal (where n is a constant). This synchronizing reference signal 111 is supplied to a frequency divider 105 and a comparator 112 as one input signal. The frequency divider 105 is initialized by the synchronizing reference signal 111 to start counting the APC clock signals 104. Since the countable value of the frequency divider 105 is chosen to be $$\frac{455 \times m \times n}{2},$$

the frequency divider 105 generates a pulse signal 106 at a repetition period of $$\frac{455 \times m \times n}{2 \times m \times f_{SC}}.$$

The pulse signal 106 is supplied to a comparator 112 as the carrier reference signal representing the subcarrier freuency. The comparator 112 compares the pulse phase of the synchronizing reference signal 111 belonging to a period following that of the synchronizing reference signal 111 which had been used to initialize the frequency divider 105 with the pulse phase of the carrier reference signal 106. Discrimination between the standard signal and the nonstandard signal is thus conducted. If the signal supplied to the terminal 101 is a standard signal, the above described equations (1) and (2) are satisfied, and hence the two reference signals supplied to the comparator 112 agree each other in phase. If the signal supplied to the terminal 101 is a nonstandard signal, the two reference signals differ from each other in phase. The output signal of the comparation circuit 112 is supplied to an integrator 113 to be integrated by a sequential filter, for example, during a constant period for preventing an unstable detection operation under disturbed synchronization caused by external disturbance, for example. The output signal of the integrator 113 is sent out as the detected nonstandard signal 114.

Owing to the present embodiment, it becomes possible to judge whether the frequency of the chrominance subcarrier signal and the horizontal and vertical scan frequencies satisfy the predetermined relation or not. As a result, the nonstandard signal can be detected.

Figure 2:
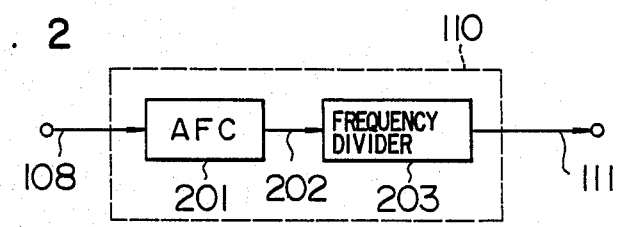
FIGS. 2, 3 and 4 are block diagrams for illustrating examples of a synchronizing reference signal generation circuit used in the detection circuit according to the present invention.

The synchronizing reference signal generator 110 will now be described by referring to FIG. 2.

An AFC circuit 201 is a circuit having a feedback loop for generating a clock signal phase-locked to the horizontal synchronizing signal 108 extracted by the synchronizing separation circuit 107. If the center frequency of a voltage controlled oscillator included in the AFC circuit 201 is so chosen as to be 1 times the frequency $f_{SC}$ of the chrominance subcarrier signal, for example, the frequency of the signal derived by applying the frequency division with a ratio $$\frac{455 \times l}{2}$$

to the output signal of the VCO agrees with the horizontal scan frequency of the inputted TV signal. Therefore, a frequency divider 203 is capable of producing the synchronizing reference signal 111 by applying the frequency division with a ratio of $$\frac{455 \times l \times n}{2}$$

to a clock signal 202 outputted from the VCO of the AFC circuit 201.

Figure 3:
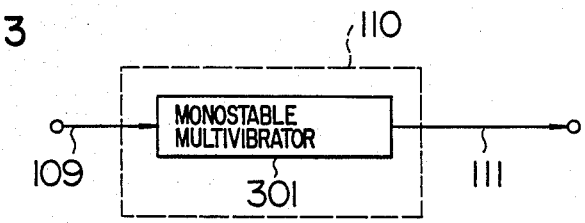

FIG. 3 shows another synchronizing reference signal generator 110. The vertical synchronizing signal 109 derived as a result of synchronizing separation is supplied to a monostable multivibrator 301 by the synchronizing separation circuit 107. The output signal 111 of the monostable multivibrator 301 has the same repetition period as the vertical synchronizing signal 109. In case the repetition period of the synchronizing reference signal 111 is so chosen as to be equal to the field repetition period, i.e., n=262.5, the synchronizing reference signal 110 is composed of a simple circuit. In case the constant n is chosen as represented by the equation n=1, the horizontal synchronizing signal 108 is used as the input signal of the monostable multivibrator 301, resulting in a simplified configuration of the synchronizing reference signal generator 110.

Figure 4:
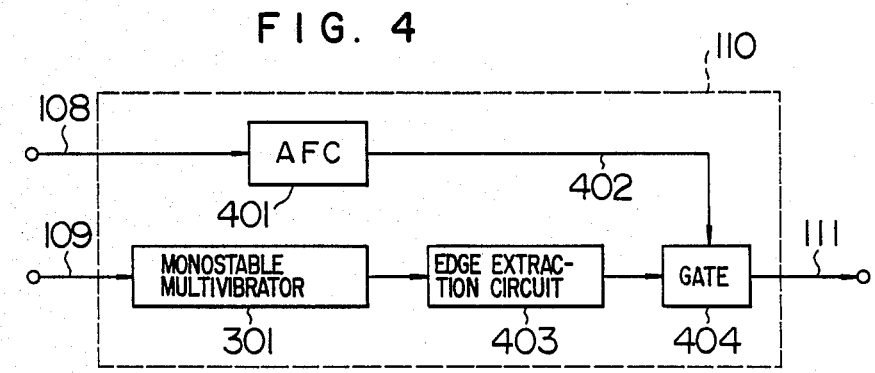
Figure 13:
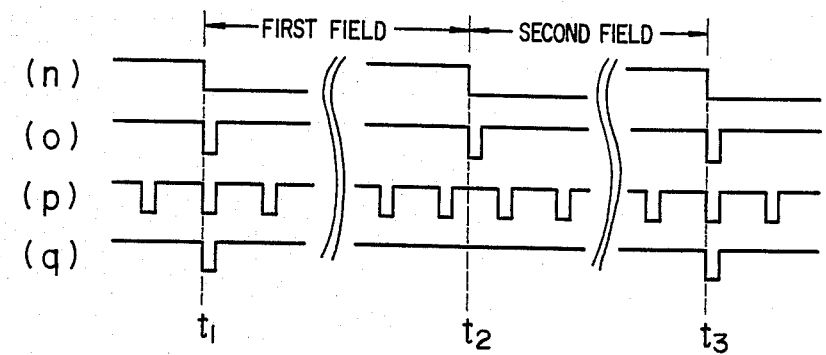

FIG. 4 shows still another synchronizing reference generator 110. This circuit is an example in which the repetition period of the synchronizing reference signal 111 is the frame period, i.e., n=525. The separated horizontal synchronizing signal 108 is inputted to the AFC circuit 401. A synchronizing pulse signal 402 phase-locked to the horizontal synchronizing signal 108 as shown in FIG. 13(p), for example, appears at the output terminal of the AFC circuit 401. Further, the vertical synchronizing signal 109 is shaped in waveform by the monostable multivibrator 301 to produce a pulse signal of vertical scan period as shown in FIG. 13(n), for example. The falling edge of the pulse (n) of the vertical scan period is extracted by an edge extraction circuit 403. The edge extraction circuit 403 generates an extraction pulse (o) as shown in FIG. 13(o), for example. The extraction pulse (o) is supplied to a gate circuit 404. The gate circuit 404 gates the extraction pulse (o) by using the above described horizontal synchronizing pulse 402. Because of the interlace relation, the phases of the horizontal synchronizing signal 108 and the vertical synchronizing signal 109 in an odd-numbered field differ from those in an even-numbered field by ½ horizontal scan period. In the gate circuit 404, therefore, the edge signal (o) of the vertical synchronizing signal belonging to a field having a displaced phase as shown in FIG. 13(q), for example, is OFF gated at time $t_2$. And the pulse signal (q) of the frame period is obtained at time $t_1$ and $t_3$.

Figure 5:
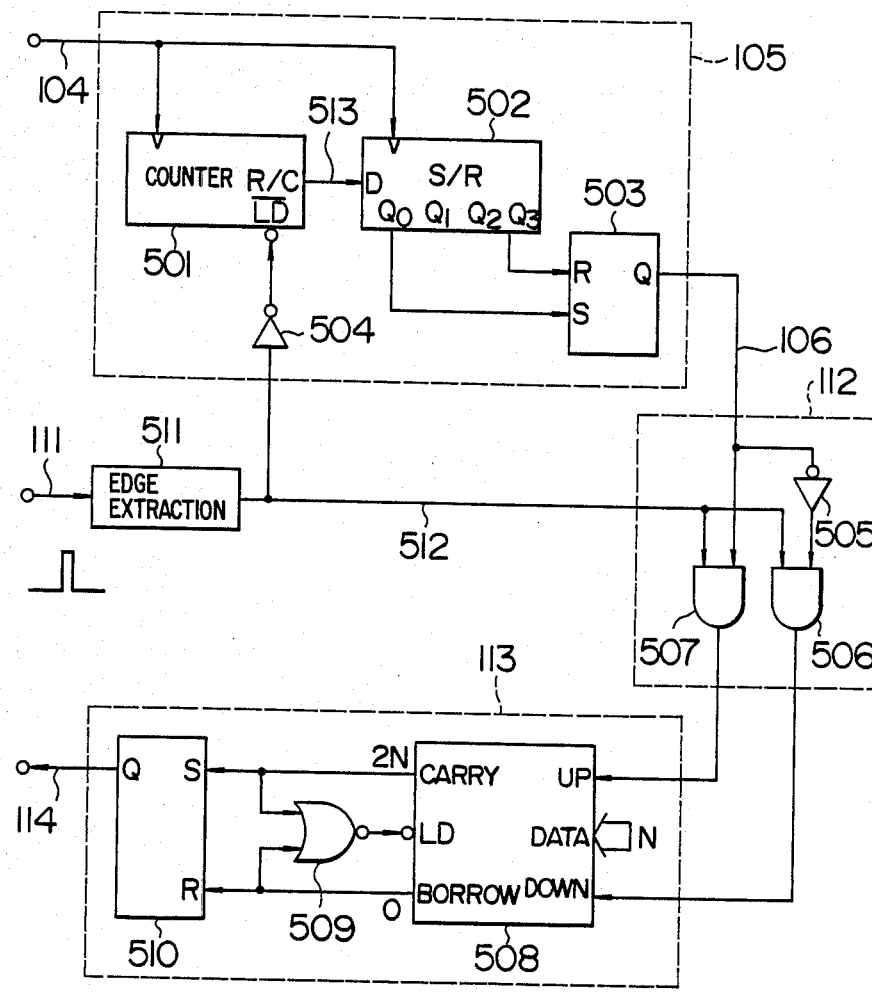
FIGS. 5 and 6 are block diagrams for illustrating an embodiment of detailed configuration of a frequency divider, a comparator and an integrator according to the present invention.

Detailed circuits of the frequency divider 105, the comparator 112 and the integrator 113 are illustrated in FIG. 5.

The frequency divider 105 is composed of a counter 501, a shift register 502, a reset-set flip-flop (RS-FF) 503, and a NOT circuit 504. The comparator 112 is composed of a NOT circuit 505 and AND circuits 506 and 507. The integrator 113 is composed of an up/down counter 508, a NOR circuit 509, and an RS-FF 510.

The operation of the circuit shown in FIG. 5 will now be described with reference to waveforms at various portions shown in FIG. 11. FIG. 11(a) shows the waveform of an APC clock signal having a frequency equivalent to m times the chrominance subcarrier frequency. FIG. 11(b) shows the waveform of the carry output signal of the counter 501. FIG. 11(c) shows the waveform of the output signal from $Q_0$ of the shift register 502. FIG. 11(d) shows the waveform of the output signal from $Q_3$ of the shift register 502. FIG. 11(e) shows the waveform of the output signal of the RS-FF 503. FIG. 11(f) shows the waveform of the output of the NOT circuit 505. FIG. 11(g) to (n) show waveforms of the output pulse signal 111 of the above described synchronizing reference generator 110.

Figure 12:
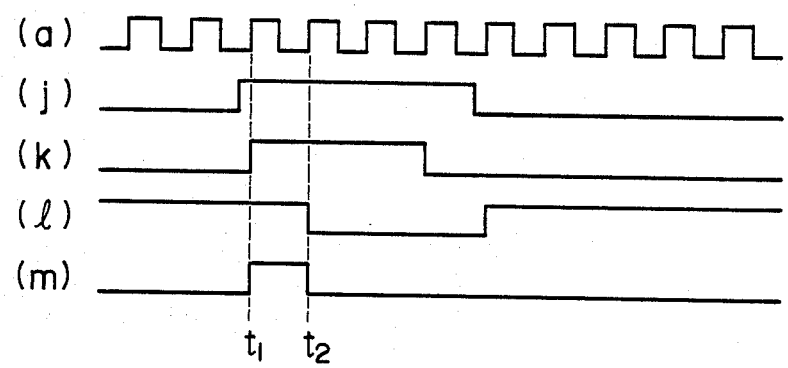

The synchronizing reference signal 111 having a period $n \times T_H$ outputted from the synchronizing reference signal generator 110 is supplied to the edge extraction circuit 511. As shown in FIG. 12, for example, the edge extraction circuit 511 latches the inputted synchronizing reference signal 111 (FIG. 12(j)) by using the APC clock ? signal (FIG. 12(a)) at time $t_1$. The latched signal (FIG. 12(k)) is latched again at time $t_2$. A signal (FIG. 12(l)) which has been delayed by one clock and inverted with respect to the signal (FIG. 12(k)) is produced. The logical product of signals (FIG. 12(k) and (l)) is produced to extract the rising edge of the synchronizing reference signal 111 as a pulse signal (FIG. 12(m)) having one clock width synchronized to the APC clock signal (FIG. 12(a)).

Figure 11:
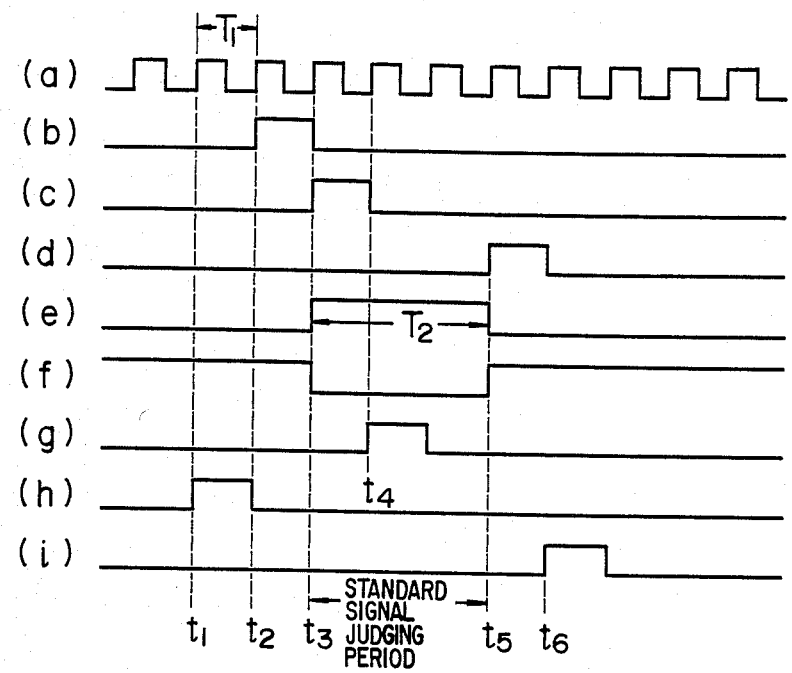
FIGS. 11, 12 and 13 are waveform diagrams for illustrating an example of operation at various portions of the detection circuit according to the present invention.

The output signal 512 of the edge extraction circuit 511 is supplied to the preset terminal of the counter 501 and respective inputs of AND circuits 506 and 507. The counter 507 is activated by the APC clock signal 104 to count the APC clock signal 104. After the clock signal 104 has been counted by $$\left( \frac{455 \times m \times n}{2} - 2 \right)$$

since the edge-extracted synchronizing reference signal 512 had been inputted, the counter 501 generates a carry signal (FIG. 11(b)) at time $t_2$ of FIG. 11. This carry signal 513 is supplied to a shift register 502 activated by the APC clock signal 104. If a carry signal as shown in FIG. 11(b) is supplied to the shift register 502 at time $t_2$, for example, a signal as shown in FIG. 11(c) is sent out from the $Q_0$ output terminal at time $t_3$ and a carry signal as shown in FIG. 11(d) is sent out from the $Q_3$ output terminal at time $t_5$. The carry signals (FIG. 11(c) and (d)) are supplied to the RS-FF 503 as the set pulse and reset pulse, respectively. The RS-FF 503 thus generates a carrier reference signal 106 having pulse width $T_2$ which is three times the period $T_1$ of the clock signal as shown in FIG. 11(e). The count value of the counter 501 is so set that the carry signal (FIG. 11(b)) may be generated two clocks earlier than a predetermined count value. In case a standard signal has been received, therefore, the synchronizing signal 512 arrives at the counter 501 at the center of the signal (FIG. 11(e)) having pulse width $T_2$. This carrier reference signal 106 (FIG. 11(e)) is supplied to the other input terminal of the first AND circuit 507 and is supplied to the other input terminal of the second AND circuit 506 via a NOT circuit 505. Therefore, the carrier reference signal 106 supplied to the second AND circuit 506 is represented as FIG. 11(f). If the synchronizing reference signal 512 arrives at the comparator 112 composed of the first AND circuit 506, the second AND circuit 507 and the NOT circuit 505 at time $t_4$ as shown in FIG. 11(g)), for example, the output signal is sent out from the first AND circuit 507. If the synchronizing reference signal 512 arrives at the comparator 112 at time $t_1$ or $t_6$ as shown in FIG. 11(h) or (i), the output signal is sent out from the second AND circuit 506. Therefore, the comparator 112 is able to determine that the TV signal is a standard signal when the synchronizing reference signal 512 exists in the range of the pulse width $T_2$ of the carrier reference signal 106. And, the TV signal is determined to be a nonstandard signal when the synchronizing reference signal 512 does not exist in the range of the pulse width $T_2$. By using the comparator 112 shown in FIG. 5, it is also possible to similarly detect nonstandard signals having such frequency errors that the synchronizing reference signal 512 arrives at the comparator 112 with stationarily displaced positions. It is also possible to detect nonstandard signals having such jitter that the synchronizing reference signal 512 arrives at the comparator 112 with positions varying every time.

In the present embodiment, the count value of the counter 510 is so set that the carry signal may be generated two clocks earlier as compared with the predetermined value. That is to say, the count value is so chosen that the time later than the rising edge of the carry signal by two clocks corresponds to the pulse position equivalent to the predetermined count value. The comparator 112 has judgment allowance of ±1 clock with respect to the carrier reference signal 106. Even if the synchronizing reference signal 111 and the carrier reference signal 116 satisfy the relation of the standard signal, a slight phase error is generally incurred between the APC clock signal 104 and the synchronizing reference signal 111. When the synchronizing reference signal 111 is processed by using the APC clock signal 104, therefore, clock jitter of ±1 clock is caused. In order to prevent this from bringing about false judgment, therefore, allowance of ±1 clock period has been defined. Further, it is possible to prevent false operation due to the influence caused upon weak electric field by noises or the like, by providing the carrier reference signal 106 with an allowance exceeding ±1 clock period. The judgment allowance for this standard signal, i.e., the pulse width $T_2$ of the carrier reference signal 106 can be suitably selected according to the precision of the signal processing system.

Output signals of the first AND circuit 506 and the second AND circuit 507 are supplied to the up/down counter 508 constituting the integrator 113. Upon the arrival of the output signal of the first AND circuit 507 which is the detected output signal of a standard signal, the up/down counter 508 counts up by one bit. Upon the arrival of the output signal of the second AND circuit 506 which is the detected output signal of a nonstandard signal, the up/down counter 508 counts down by one bit. When the count value of the up/down counter 508 has reached 2N or 0, the up/down counter 508 generates a carry signal (count value=2N) or a borrow signal (count value=0), and thereafter the count value is initialized to N. The carry signal and the borrow signal are generated only when the occurrence probability of the output signal of either the first AND circuit 506 or the second AND circuit 507 becomes high. Thereby, a minute change of the detection signal 114 is prevented. The occurrence of the carry signal sets the RS-FF 510, the detection output signal 114 indicating that the input signal is a standard signal. The occurrence of the borrow signal resets the RS-FF 510, the detection output signal 114 indicating that the input signal is a nonstandard signal.

By using this circuit, the standard/nonstandard signal can be easily and stably detected.

In the present embodiment, the integrator 113 is constituted by the up/down counter. However, it is evident that the integrator 113 may also be constituted by a bidirectional shift register.

Figure 6:
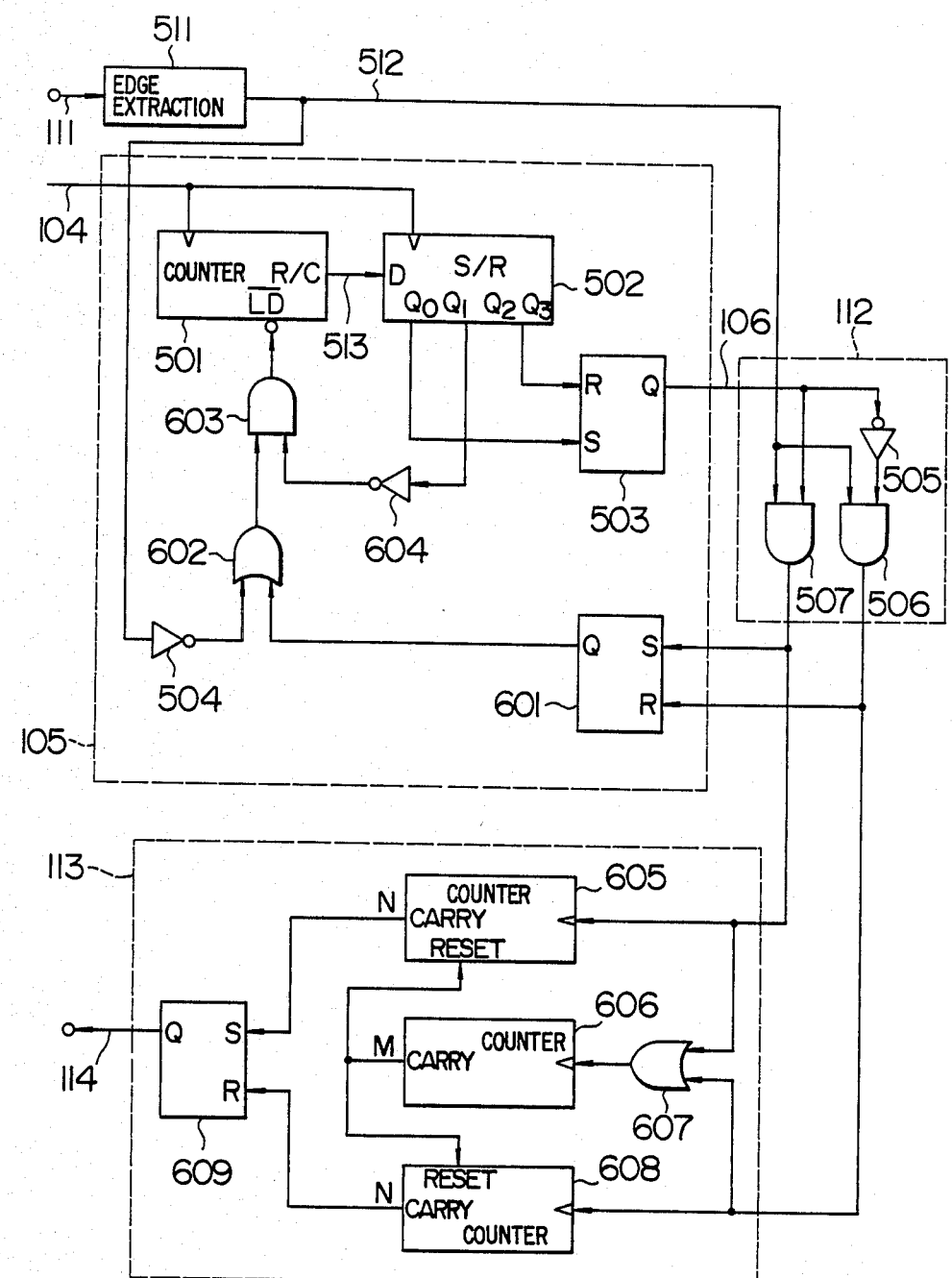

The second circuit example for illustrating details of the frequency divider 105, comparator 112, and integrator 113 will now be described by referring to FIG. 6.

The frequency divider 105 is composed of a counter 501, a shift register 502, RS-FF's 503 and 601, NOT circuits 504 and 604, an OR circuit 602, and an AND circuit 603. The integrator 113 is composed of N-stage counters 605 and 608, an M-stage counter 606, an OR circuit 607, and an RS-FF 609. The comparator 112 is constituted in the same way as the preceding embodiment.

The basic operation of this circuit is similar to that of the preceding embodiment. The carrier reference signal 106 having pulse width of 3 clock periods is derived from the output terminal of the RS-FF 503. The comparator 112 compares the above described synchronizing reference signal 512 with the carrier reference signal 106 to produce a standard/nonstandard detection pulse signal.

The output signals of the comparator 112 is supplied to the integrator 113 and is used as the set pulse and the reset pulse of the RS-FF 601 constituting the frequency divider 105. When a standard signal is detected by the comparator 112, the RS-FF 601 is set and its output "1" is supplied to the OR circuit 602. As a result, the initialization of the counter 501 by the synchronizing reference signal 512 is inhibited. The RS-FF 503 is initialized by a carry signal aligned in phase with a predetermined count value, i.e., the output signal $Q_1$ of the shift register 502. Thus, the frequency divider 105 runs freely. When the comparator 112 has recognized the input signal 104 as a nonstandard signal, the RS-FF 601 is reset, and the frequency divider 105 is initialized by the above described synchronizing reference signal 512.

In this circuit, the frequency divider 105 is made to run freely if a standard signal has been detected with a period present in the frequency divider 105. And the comparison period is increased to twice at the next comparison point. If the standard signal has been detected at that period as well, the comparison period is increased to three times at the next comparison point.

In this circuit, therefore, it is possible to detect not only jitter of a particular frequency component but also all jitter of frequency components having a period equivalent to an integer times the period set in the frequency divider 105, resulting in improved detection precision.

In the same way as the preceding embodiment, the output signal of the comparator 112 is integrated by the integrator 113 to become the nonstandard detection signal 114. The operation of the integrator 113 in the present circuit example will now be described. The output signal of the above described first AND circuit 507 constituting the comparator 112 is supplied to the first counter 605 as the clock input signal and is supplied to the second counter 606 via the OR circuit 607 as the clock input signal. The output signal of the second AND circuit 506 is supplied to the third counter 608 as the clock input signal and is supplied to the second counter 606 via the OR circuit 607 as the clock input signal.

Either of the first counter 605 and the third counter 608 generates the carry signal and assumes the count value 0 when the counter has counted up to N. And the second counter 606 generates the carry signal and assumes the count value 0 when the counter has counted up to M (where $N \leq M < 2N$). If the occurrence probability of either one of the first AND circuit 506 and the second AND circuit 507 becomes high, the first counter 605 or the third counter 608 generates the carry signal before the second counter 606 generates the carry signal. In the present integrator 113 as well, therefore, a minute change of the detection signal 14 is prevented in the same way as the circuit shown in FIG. 5. Since the carry signal of the first counter 605 and the carry signal of the second counter 606 are supplied to the RS-FF 609 respectively as the set pulse and reset pulse, the integrated detection signal 114 is obtained at the output terminal of the RS-FF 609.

In the present embodiment, therefore, the detection precision for jitter is improved, and the standard/nonstandard signal can be detected stably.

In the present embodiment, the integrator 113 is composed of the N-stage counters 605 and 608 and the M-stage counter 606. Even if N-stage shift registers and an M-stage shift register are used instead of those counters, a similar function is attained.

The third circuit example of the integrator 113 will now be described by referring to FIG. 14. In the circuit shown in FIG. 14, all of the first N-stage counter 605, the third N-stage counter 608, and the second M-stage counter 606 in the integrator shown in FIG. 6 are initialized when either one of these counters sends out a carry signal. The RS-FF 609 is set by the carry signal of the first N-stage counter 605 and is reset by the carry signal of the second M-stage counter 606 or the third N-stage counter 608.

In this integrator, the second M-stage counter 606 at first generates the carry signal when the judgment result of the standard signal in the comparator 112 is nearly equal to that of the nonstandard signal, for example. (In such a case, the probability of the nonstandard signal is large.) As a result, the RS-FF 609 is reset by the above described carry signal, resulting in raised detection sensitivity for the nonstandard signal.

Figure 14:
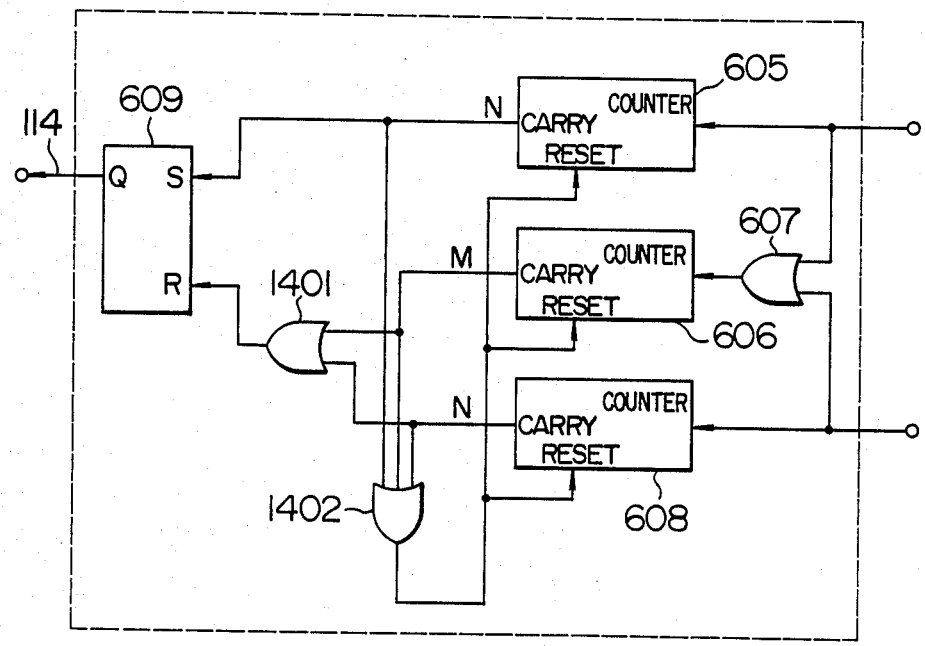
FIGS. 14 and 15 are circuit diagrams of the integration circuit.

In the circuit of FIG. 14 as well, the first counter 605, the second counter 606 and the third counter 608 may be constituted by shift registers.

Figure 15:
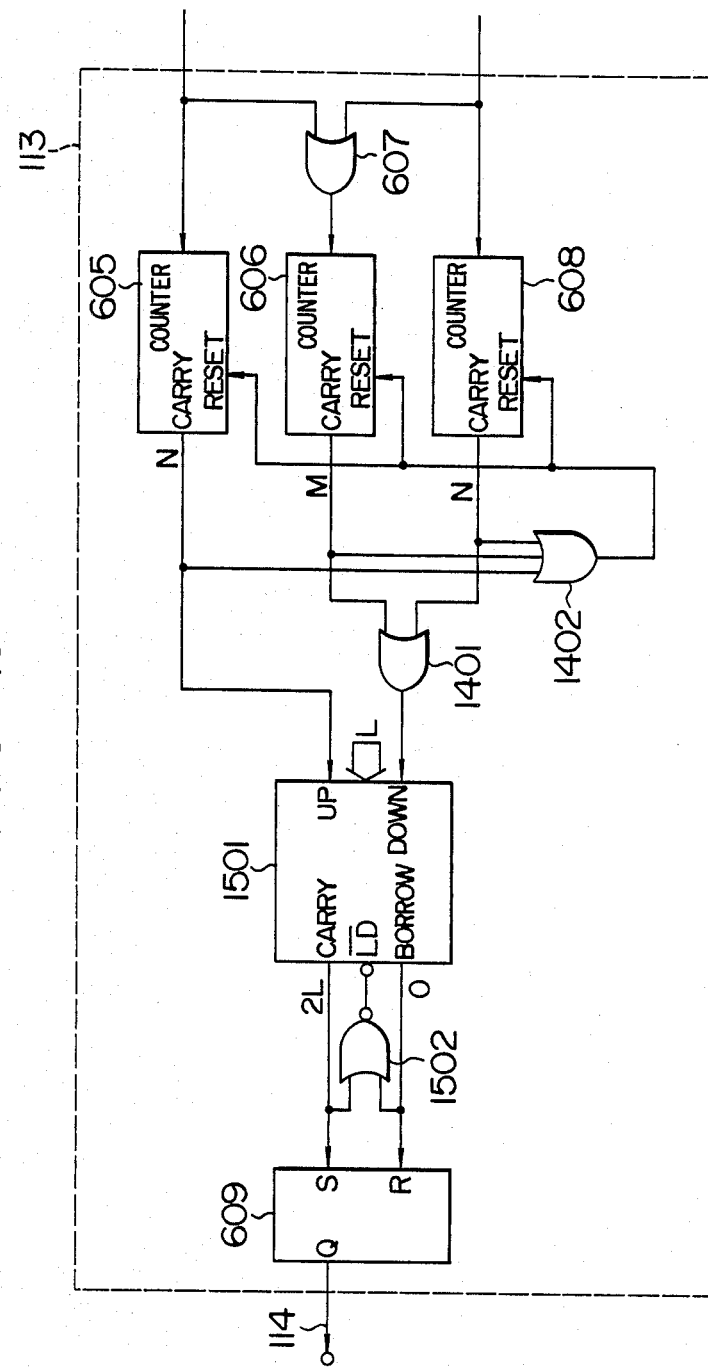

The fourth circuit example of the integrator 113 is shown in FIG. 15.

In the circuit of FIG. 15, the integrated signal in the circuit of FIG. 14 is further integrated by an up/down counter 1501 and is supplied to the above described RS-FF 609.

In the present embodiment, sudden misjudgment is prevented in case it is difficult to judge whether the signal is a standard signal or a nonstandard signal. As a result, the judgment signal 114 becomes more stable. In the circuit of FIG. 15 as well, the first counter 605, the second counter 606, and the third counter 608 may be constituted by shift registers and the up/down counter 1501 may be constituted by a bidirectional shift register. The up/down counter may be constituted by two N-stage counters and one M-stage counter.

Combination of the above described frequency divider 105, the integrator 113, the synchronizing reference signal generator 110 and the like can be arbitrarily selected.

The detection means of a nonstandard signal according to the present invention can be applied to TV signals in which a particular relation is predetermined between the chrominance subcarrier frequency, the horizontal scan frequency and the vertical scan frequency.

A signal processing circuit using the detection circuit will now be described by referring to FIG. 7.

The TV signal inputted to an input terminal 101 is supplied to a delay line 701 and a band-pass filter 717. The TV signal passed through the delay line 701 is converted into a digital signal by an A/D converter 702. The resultant digital signal is supplied to a frame comb filter 706, a line comb filter 707, and a low-pass filter 716. In the frame comb filter 706, signal processing is conducted between two frame signals which are adjacent each other, and the luminance signal is separated from the TV signal. In the line comb filter 707, signal processing is conducted between two scan lines which are adjacent each other, and the luminance signal is separated. Each luminance signal is supplied to a mixer 708. In accordance with the movement amount of the video signal detected by a movement detection circuit 703, the mixer 708 controls the mixture ratio of the output signal of the above described frame comb filter 706 to the output signal of the line comb filter 707. As a result, the mixed luminance signal is generated. This luminance signal is inputted to a field interpolation filter 710, a line interpolation filter 711, and a double speed conversion circuit 713 via a switch circuit 709. Output signals of these two interpolation filters 710 and 711 are supplied to a mixer 712. The mixture ratio is controlled by a control signal 704 outputted from the movement detection circuit 703. An interpolated signal 744 is produced in the mixer 712. The double speed conversion circuit 713 compresses an actual signal 743 and an interpolation signal 744 simultaneously inputted therewith to half in time. The resultant successive scan signal in time series is supplied to a D/A converter 714. A luminance signal Y is thus supplied to a terminal 715.

On the other hand, the TV signal supplied to a band-pass filter 717 is selected there. Only the signal belonging to a band in which chrominance signals are multiplexed passes through the filter 717. The passed signal is supplied to a chrominance demodulation circuit 719 via an ACC circuit 718 and is demodulated there. The demodulated color difference signals R-Y and B-Y are respectively supplied to A/D converters 720 and 721 to be converted into digital signals. The color difference signals R-Y and B-Y converted into digital signals are time-division multiplexed while taking picture elements as units and are supplied to a frame comb filter 724 and a line comb filter 725. The luminance signal component is removed by inter-frame signal processing. The luminance signal component is removed by inter-line signal processing. In a mixer 726, the mixture ratio between the output signal of the frame comb filter 724 and the output signal of the line comb filter 725 is controlled by the above described control signal 704. The mixed chrominance signal is thus formed in the mixer 726. This mixed chrominance signal is supplied to a demultiplexer 729 via a switch circuit 728 to be separated into color difference signals R-Y and B-Y again. Interpolated signals 732 and 734 for the color difference signals R-Y and B-Y are produced in line interpolation filters 730 and 733, respectively. The interpolated signals 732 and 734 are processed in double speed conversion circuits 737 and 736 and D/A converters 738 and 739 in the same way as the luminance signal. The resultant double density successive scan signals are supplied to terminals 740 and 741.

The above described signal processing has heretofore been applied to standard signals but is not suitable to nonstandard signals as described before. When the nonstandard signal detection circuit according to the present invention has detected a nonstandard signal, therefore, the detection signal 114 controls the switch circuit 709 to supply the output signal of a low-pass filter 716 coupled to the A/D converter 702 to the interpolation filters and controls the switch circuit 728 to supply the output signal of the multiplexer 723 to the demultiplexer 729. That is to say, the luminance signal and the color difference signal are simply separated in the frequency domain. At the same time, the switch circuit 742 is also controlled. This switch circuit 742 is supplied with a clock signal (hereinafter referred to as an AFC clock signal) 262 fed from the AFC circuit and the APC clock signal 104. The output signal of the switch circuit 742 is supplied to the signal processing circuit as the system clock of the digital processing circuit of the signal processing system ranging from the A/D converter to the D/A converter. The frequency of the AFC clock signal 262 is chosen to be equal to that of the APC clock signal 104. When a standard signal has been detected, the APC clock signal having high stability in frequency is supplied to the video signal circuit. When a nonstandard signal has been detected, the AFC clock signal 262 is supplied to the video signal circuit as the system clock signal.

In general, a frame delay line used in the frame comb filter is composed of a memory having as many picture elements as one frame. If the sampling frequency of A/D conversion is chosen to be four times the chrominance subcarrier frequency, for example, one frame will have $$4 \times \frac{455}{2} \times 525$$

picture elements. When a standard signal has been detected, the phases of the two video signals are the same and the phases of the chrominance subcarrier signal are opposite between the input and output terminals of the frame delay line whether the clock signal may be the APC clock signal or the AFC clock signal. If the frame memory is driven by the APC clock signal when a nonstandard signal has been received, the phase of the chrominance subcarrier signal remains opposite, but the phases of two video signals between the input and output terminals of the frame delay line are displaced. As a result, the movement detection cannot be effected. If the frame memory is activated by the AFC clock signal, the contrary holds true. That is to say, two video signals between the input and output of the frame delay line agree, but the relation that the phases of the chrominance subcarrier signal are opposite does not hold true. As a result, the signal processing in the frame comb filter 706 cannot be effected properly.

When the input signal is a nonstandard signal in the present embodiment, therefore, the AFC clock signal is selected as the system clock signal by the detection signal 114. Accordingly, false operation of the movement detection circuit is prevented and the scan line interpolation of the video signal of the movement adaptive type is realized.

The second example of the signal processing apparatus controlled by the detection circuit of the present invention will now be described by referring to FIG. 8.

If the input signal 101 is a standard signal, respective output terminals of switch circuits 802 and 803 are coupled to the input terminal 101, and switch circuits 709 and 728 are so coupled as to select the output signals of the above described mixers 708 and 726, respectively. A switch circuit 742 is so controlled by the nonstandard detection signal 114 as to select the APC clock signal 104, signal processing similar to that of the circuit shown in FIG. 7 is carried out.

If the input signal 101 is a nonstandard signal, the nonstandard detection signal 114 controls the switch circuit 802 so as to select the luminance signal separated by a line comb filter 801, controls the switch circuit 803 so as to select the chrominance signal separated by the line comb filter 801, controls the switch circuit 709 so as to select the output signal of the A/D converter 702, controls the switch circuit 728 so as to select the output signal of the multiplexer 723, and controls the switch circuit 742 so as to select the AFC clock 262. By using this apparatus, it is possible to realize the scan line interpolating signal processing of movement adaptation type in the same way as the circuit of FIG. 7. In addition, it is also possible to mitigate the cross-color dot disturbance because the line comb filter 801 separates the luminance signal Y and the chrominance signal C. The line comb filter 801 may be constituted by an analog circuit. Alternatively, the line comb filter 801 may be constituted by a digital circuit driven by the APC clock signal.

The third apparatus involving control means of a signal processing system including the detection circuit of the present invention will now be described by referring to FIG. 9. In this apparatus, the system clock signal is the APC clock signal. The movement detection circuit 703 is controlled by the detection signal 114. If the TV signal supplied to the input terminal 101 is a standard signal, the mixers 708, 712 and 726 are controlled in accordance with the output signal of the movement detection circuit 703. If the TV signal is a nonstandard signal, the output of the movement detection circuit 703 is kept at a predetermined value so that the mixture ratios of the output signals of the frame comb circuit 706 and the field interpolation circuit 710 may be defined to be "0" in the mixers 708 and 712 and the mixture ratios of the output signals of the line comb circuit 707 and the line interpolation circuit 711 may be defined to be "1".

Figure 9:
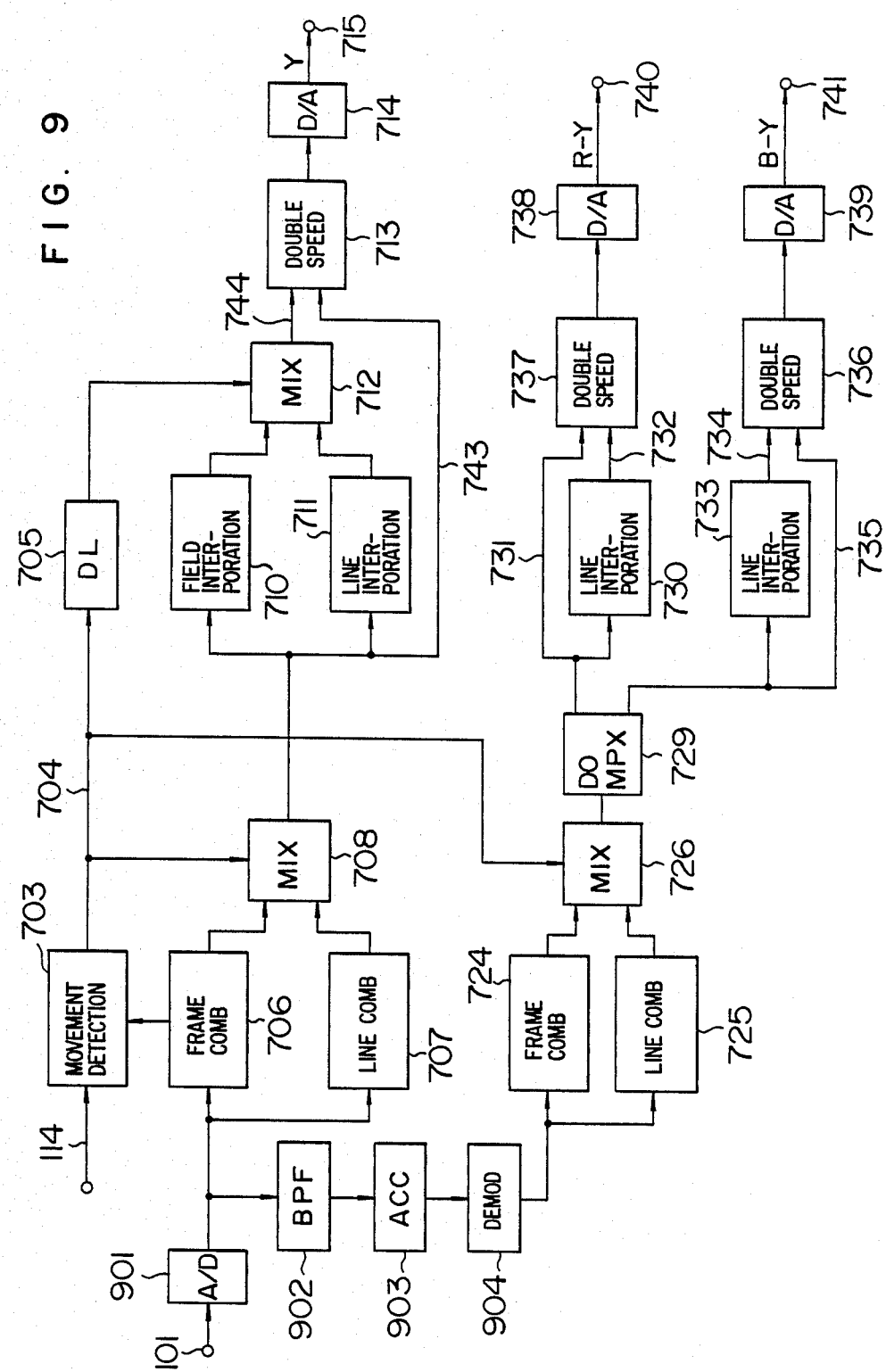

In the apparatus of FIG. 9, therefore, the APC clock signal is always used as the system clock signal. Accordingly, a band-pass filter 902, an ACC circuit 903 and a chrominance demodulation circuit 904 can be constituted by digital circuits. As a result, the whole signal circuit can be constituted by digital circuits.

Figure 10:
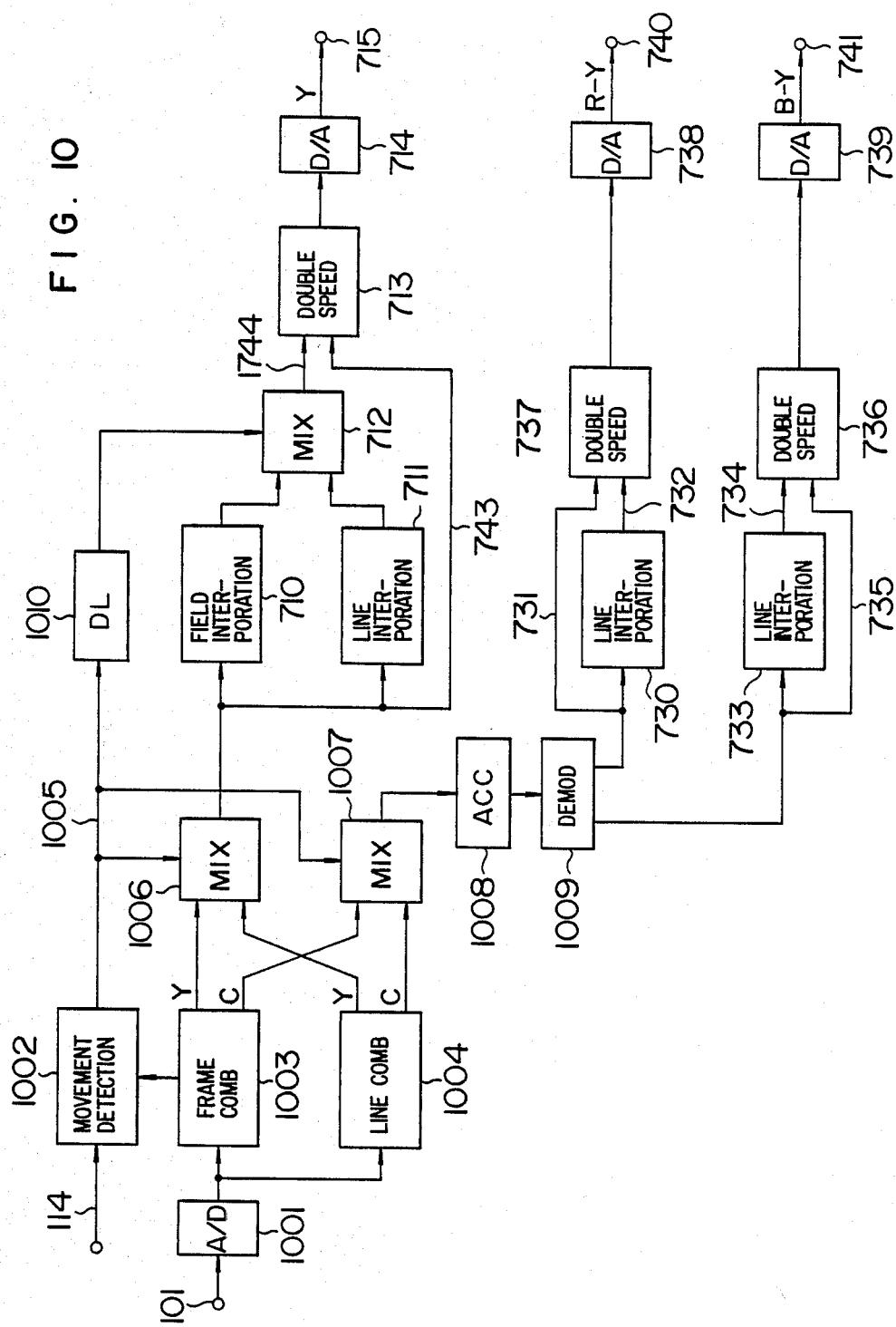

The fourth example of the signal processing apparatus using the detection circuit of the present invention will now be described by referring to FIG. 10.

Figure 7:
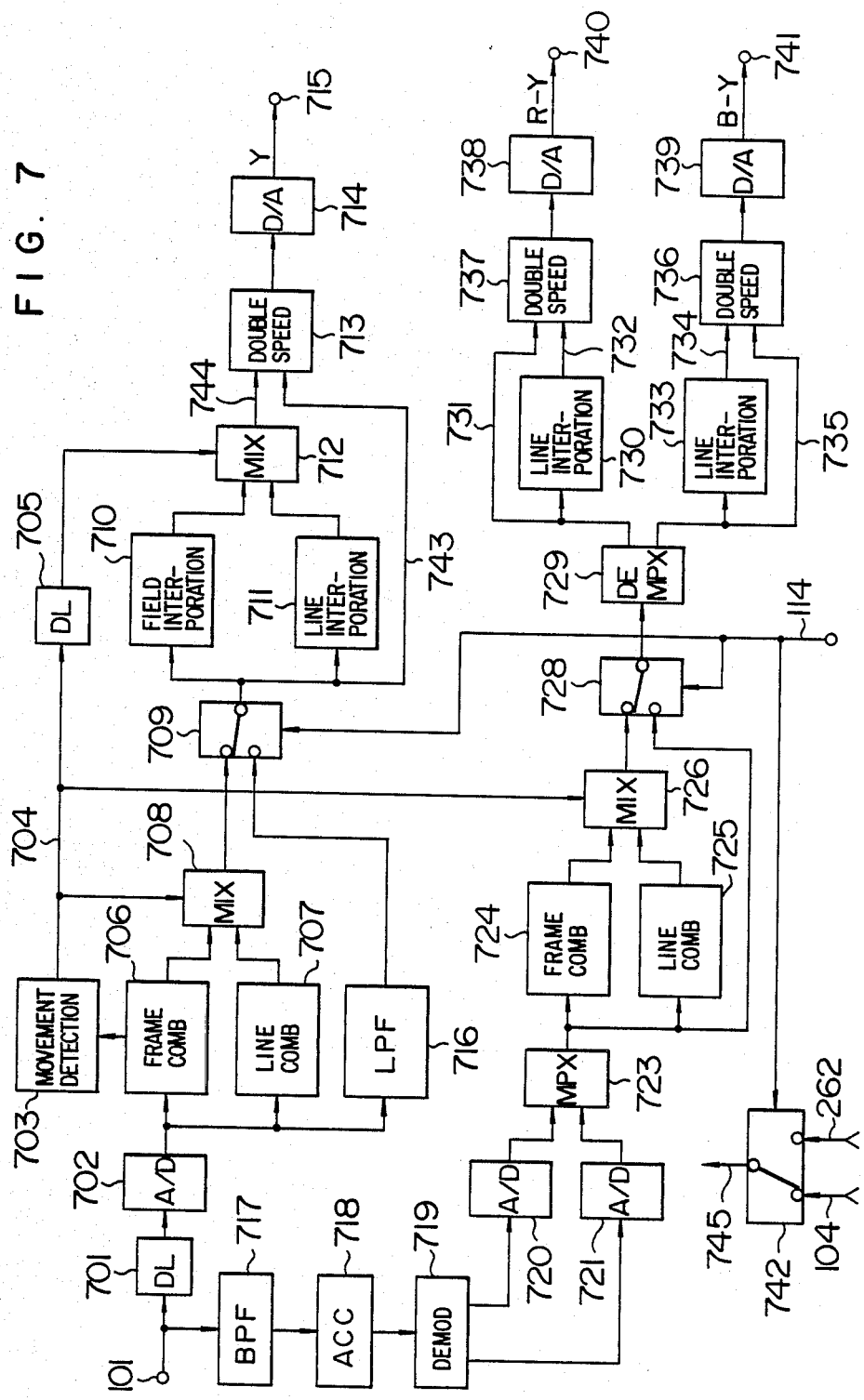
FIGS. 7, 8, 9 and 10 are block diagrams for illustrating examples of a signal processing apparatus in which the detection circuit of the present invention is used.
Figure 8:
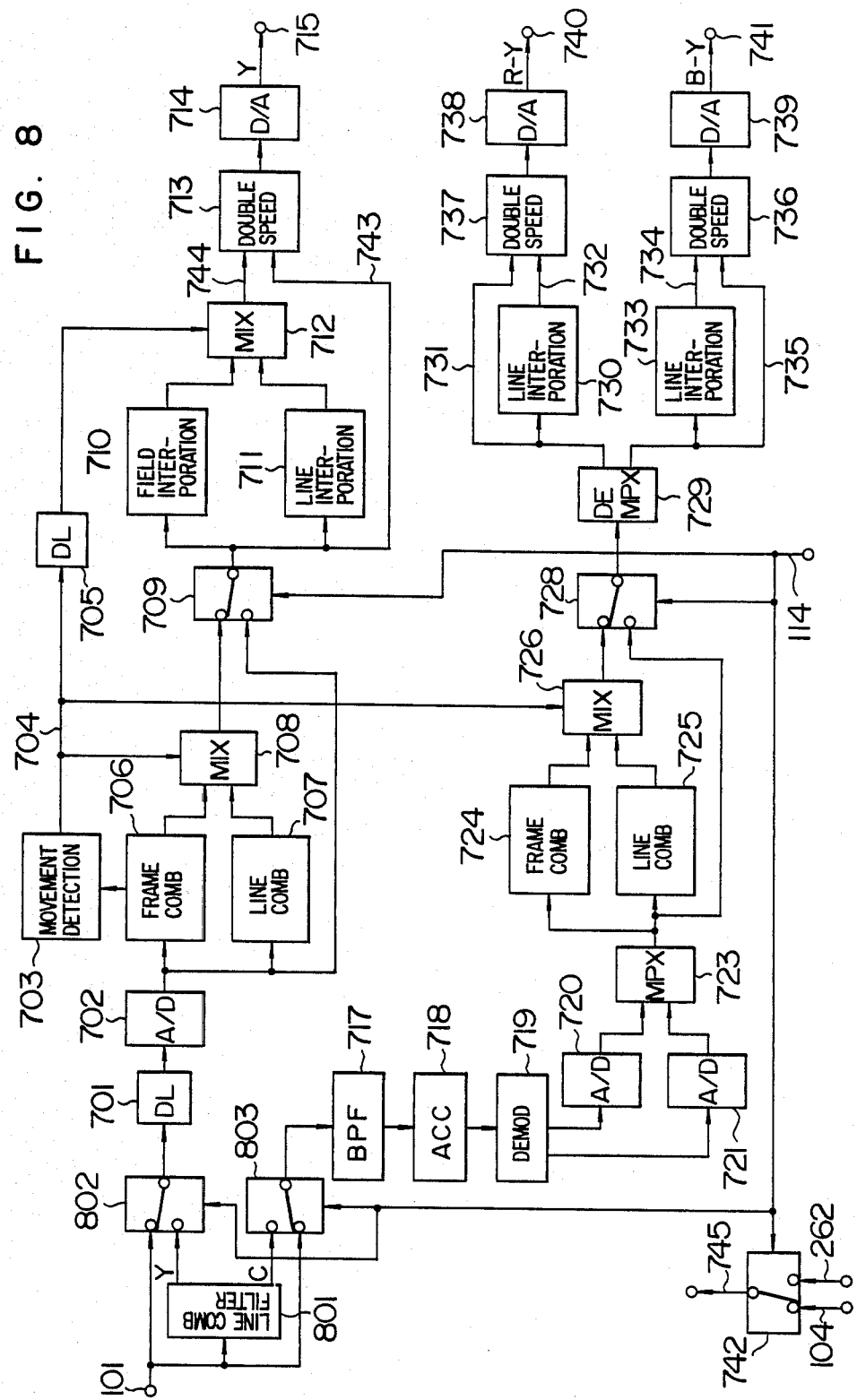

In the present apparatus, the circuit for separating the luminance signal and the chrominance signal used in the apparatuses of FIGS. 7, 8 and 9 is constituted by one frame comb circuit and one line comb circuit. The APC clock signal is used as the system clock signal, and a movement detection circuit 1002 is controlled by the nonstandard detection signal 114. In a frame comb filter 1003, the frame delay line, for example, is used in common. The luminance signal is formed from the sum of video signals of two frames, and the chrominance signal is separated by using the defference between two video signals. In a line comb filter 1004, the line delay line is used in common. The luminance signal is formed from the sum of video signals between two lines, for example, and the chrominance signal is separated by using the difference between two video signals. The respective separated luminance signal and chrominance signal are mixed in mixers 1006 and 1007 with mixture ratios defined by a control signal 1005 outputted from the movement detection circuit 1002. The mixed signals are outputted from the mixers 1006 and 1007. The luminance signal thus separated undergoes scan interpolation processing of movement adaptation type in the field interpolation circuit 710, the line interpolation circuit 711 and the mixer 712. The chrominance signal is supplied to a chrominance demodulation circuit 1009 via an ACC circuit 1008. After the chrominance signal has undergone the chrominance demodulation in the chrominance demodulation circuit 1009, the scan line interpolation processing is carried out in the line interpolation circuit 730 and the line interpolation circuit 733.

In a TV receiver having a frame comb filter and a line comb filter, it is possible to judge correctly whether the received TV signal is a standard TV signal or a nonstandard TV signal by using the above described detection circuit of the present invention. The signal processing circuit is controlled by the detection signal of this detection circuit. The signal processing circuit is able to properly separate the luminance signal and the chrominance signal from the TV signal.

We claim:
1. A detection circuit used in A TV receiver to detect whether the received TV signal is a standard TV signal to not, comprising:

(a) an automatic phase control circuit supplied with a color burst signal of frequency $f_{SC}$ included in the TV signal, said automatic phase control circuit including means for generating a clock signal synchronized to said color burst signal, said clock signal having a frequency $m \times f_{SC}$, m being a constant;

(b) a synchronizing reference signal generating circuit supplied with a synchronizing signal included in the TV signal, said synchronizing reference signal generating circuit including means for generating a first reference signal, the period of said first reference signal being n times the period of said synchronizing signal, n being a constant;

(c) a frequency division circuit connected to said automatic phase control circuit and said synchronizing reference signal generating circuit and supplied with said clock signal from said automatic phase control circuit and said first reference signal from said synchronizing reference signal generating circuit, said first frequency division circuit being initialized by said first reference signal, said first frequency division circuit including means for generating a second reference signal by demultiplying the frequency of said clock signal with a ratio of $k \times m'n$, k being a constant;

(d) a comparator circuit connected to said first frequency division circuit and said synchronizing reference signal generating circuit and supplied with said first reference signal from said synchronizing reference signal generating circuit and said second reference signal from said first frequency division circuit, said comparator circuit including means for comparing the phase of said first reference signal with the phase of said second reference signal and for generating a coincidence signal upon coincidence between phases of said first and second reference signals and for generating of noncoincidence signal upon noncoincidence between phases of said first and second reference signals; and (e) an integrator circuit connected to said comparator circuit to integrate said coincidence signal or said noncoincidence signal supplied from said comparator circuit;

wherein said integrator circuit comprises:

(e1) counters connected to said comparator circuit to count said coincidence signals and said non-coincidence signals supplied from said comparator circuit; and (e2) a reset-set flip-flop connected to said counters so as to be reset or set by the output signals of said counters.

2. A detection circuit according to claim 1, wherein said counter includes shift registers.

3. A detection circuit used in a TV receiver to detect whether the received TV signal is a standard TV signal or not, comprising:

(a) an automatic phase control circuit supplied with a color burst signal of frequency $f_{SC}$ included in the TV signal, said automatic phase control circuit including means for generating a clock signal synchronized to said color burst signal, said clock signal having a frequency $m \times f_{SC}$, m being a constant;

(b) a synchronizing reference signal generating circuit supplied with a synchronizing signal included in the TV signal, said synchronizing reference signal generating circuit including means for generating a first reference signal, the period of said first reference signal being n times the period of said synchronizing signal, n being a constant;

(c) a first frequency division circuit connected to said automatic phase control circuit and said synchronizing reference signal generating circuit and supplied with said clock signal from said automatic phase control circuit and said first reference signal from said synchronizing reference signal generating circuit, said first frequency division circuit being initialized by said first reference signal, said first frequency division circuit including means for generating a second reference signal by demultiplying the frequency of said clock signal with a ratio of $k \times m \times n$, k being a constant;

(d) a comparator circuit connected to said first frequency division circuit and said synchronizing reference signal generating circuit and supplied with said first reference signal from said synchronizing reference signal generating circuit and said second reference signal from said first frequency division circuit, said comparator circuit including means for comparing the phase of said first reference signal with the phase of said second reference signal and for generating a coincidence signal upon coincidence between phases of said first and second reference signals and for generating a noncoincidence signal upon noncoincidence between phases of said first and second reference signals, wherein said synchronizing reference signal generating circuit comprises:

(b1) an automatic frequency circuit supplied with the horizontal synchronizing signal, said automatic frequency circuit generating a synchronizing pulse signal synchronized to the horizontal synchronizing signal, aid synchronizing pulse signal having the same frequency as the horizontal synchronizing signal;

(b2) a monostable multivibrator supplied with the vertical synchronizing signal, said monostable, multivibrator shaping the waveform of the vertical synchronizing signal;

(b3) edge extraction circuit connected to said monostable multivibrator and supplied with the shaped vertical synchronizing signal from said monostable multivibrator, said edge extraction circuit extracts the edge portion of the vertical synchronizing signal to generate an extracted pulse; and (b4) a gate circuit connected to said AFC circuit and said edge extraction circuit and supplied with said synchronizing pulse from said ARC circuit and said extracted pulse from said edge extraction circuit, said gate circuit generating an output signal upon coincidence of phases of said synchronizing pulse and said extracted edge pulse.

4. A detection circuit used in a TV receiver to detect whether the received TV signal is a standard TV signal or not, comprising:

(a) an automatic phase control circuit supplied with a color burst signal of frequency $f_{SC}$ included in the TV signal, said automatic phase control circuit including means for generating a clock signal synchronized to said color burst signal, said clock signal having a frequency $m \times f_{SC}$, m being a constant;

(b) a synchronizing reference signal generating circuit supplied with a synchronization signal included in the Tv signal, said synchronizing reference signal generating circuit including means for generating a first reference signal, the period of said first reference signal being n times the period of said synchronizing signal, n being a constant;

(c) a frequency division circuit connected to said automatic phase control circuit and said synchronizing reference signal generating circuit and supplied with said clock signal from said automatic phase control circuit and said first reference signal from said synchronizing reference signal generating circuit, said first frequency division circuit being initialized by said first reference signal, said first frequency division circuit including means for generating a second reference signal by demultiplying the frequency of said clock signal with a ratio of $k \times m \times n$, k being a constant;

(d) a comparator circuit connected to said first frequency division circuit and said synchronizing reference signal generating circuit and supplied with said first reference signal from said synchronizing reference signal generating circuit and said second reference signal from said first frequency division circuit, said comparator circuit including means for comparing the phase of said first reference signal with the phase of said second reference signal and for generating a coincidence signal upon coincidence between phases of said first and second reference signals and for generating a noncoincidence signal upon noncoincidence between phases of said first and second reference signals;

(e) an integrator circuit connected to said comparator circuit to integrate said coincidence signal or said noncoincidence signal supplied from said comparator circuit, wherein said integrator circuit comprises:

(e1) a counted connected to said comparator circuit to count said coincidence signal and said noncoincidence signals supplied from said comparator circuit; and (e2) a reset-set flip-flop connected to said counters to be reset or set by the output of said counters.

* * * * *